R. J. ISAACSON.
MOUNTING OF AERIAL PROPELLERS.
APPLICATION FILED DEC. 18, 1911.
1,027,252.
Patented May 21, 1912.
2 SHEETS—SHEET 1.
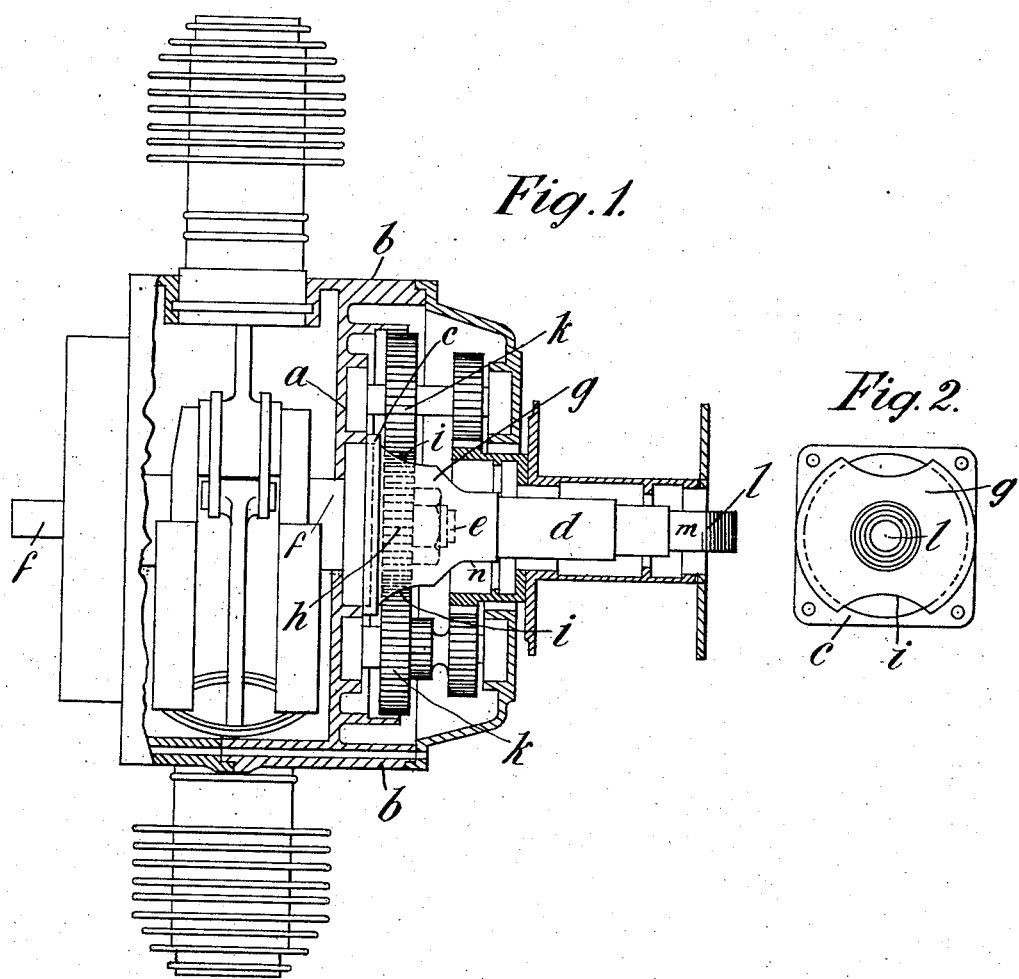

R. J. ISAACSON.
MOUNTING OF AERIAL PROPELLERS.
APPLICATION FILED DEC. 16, 1911.
1,027,252.
Patented May 21, 1912.
2 SHEETS—SHEET 2.
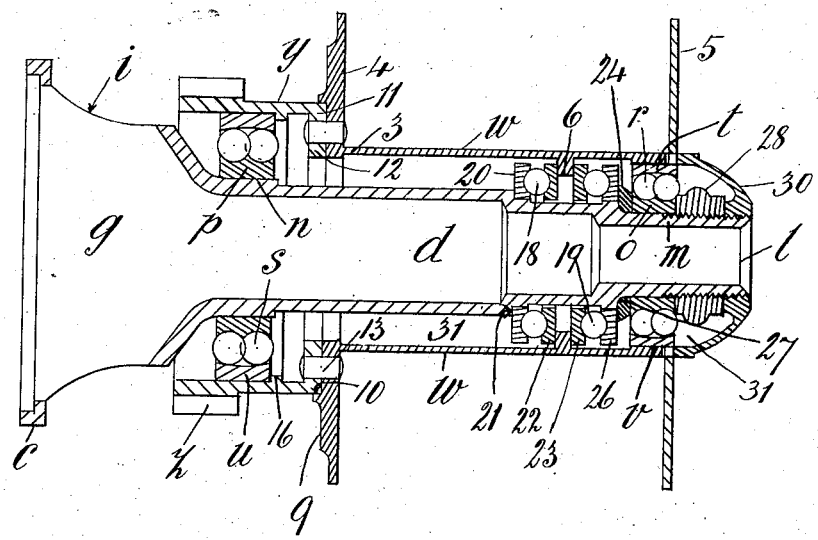
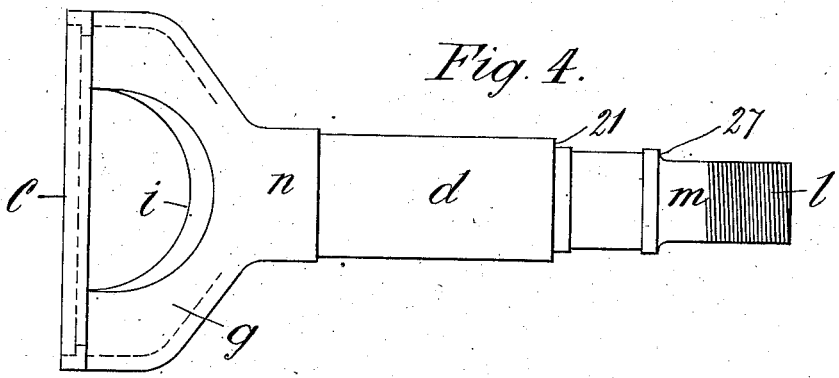
Witnesses
Arthur Storey
Robert Edwin Peacock Graver
Inventor
Rupert John Isaacson.
By Hubert E Beck
Attorney.

UNITED STATES PATENT OFFICE.

RUPERT JOHN ISAACSON, OF LEEDS, ENGLAND.

MOUNTING OF AERIAL PROPELLERS.

1,027,252.　　　　　Specification of Letters Patent.　　Patented May 21, 1912.

Application filed December 16, 1911. Serial No. 666,262.

*To all whom it may concern:*

Be it known that I, RUPERT JOHN ISAACSON, a subject of the King of Great Britain and Ireland, residing at Leeds, in the county of York, England, have invented Improvements in the Mounting of Aerial Propellers, of which the following is a specification.

This invention has for object to provide an improved arrangement of mounting the aerial propellers of flying machines.

According to the invention the crank casing of the motor that drives the propeller is provided with a fixed tubular carrier that projects outwardly and on which the propeller bush and the driving wheel therefor are mounted to rotate. End thrust of the propeller may be taken by a suitable thrust bearing which may for example be of the ball type.

To facilitate easy running the said carrier is fitted with ball bearings for the propeller boss and toothed wheel secured thereto. Thrust bearings, which may be of the ball type, are adapted to prevent endwise movement of the propeller bush on the carrier in both directions and conveniently these bearings work in conjunction with an inwardly extending thrust flange on the propeller bush.

The rotary bearings as well as the thrust bearings are located in an annular space formed between the tubular carrier and the driving wheel boss and propeller bush, and a cap is provided for closing the end of this space, to retain lubricant in the bearings.

Figure 1 of the accompanying illustrative drawings, is a sectional elevation of a driving motor showing the fixed tubular carrier and its flange secured to one end of the crank casing, according to this invention. Fig. 2 is an end view of the fixed tubular carrier and flange. Fig. 3 is a sectional elevation of the tubular carrier showing a propeller bush, and the cylindrical boss of the driving wheel, mounted to revolve on ball bearings around the said carrier, and also showing means for preventing endwise movement of the propeller bush on the tubular carrier and for taking the end thrust of the propeller while revolving. Fig. 4 is an elevation of the tubular carrier and its flange.

To the end *a* of the motor casing *b* is secured the flange *c* of the tubular carrier which extends outwardly concentric with the end *e* of the crank shaft *f*. The part *g* between the flange *c* and the cylindrical portion *d* of the carrier may be enlarged as shown, or it may be of any other suitable configuration, such that it can surround the driving wheel *h* secured on the end *e* of the crank shaft, appropriate orifices *i* being formed through it to allow the gear wheels *k* to mesh with the said driving wheel *h*.

On the outer periphery of the tubular carrier, near its outer end *l* on a part *m* of reduced diameter, and on a part *n* of enlarged diameter some distance from the part *m*, are arranged inner ball bearing guides or races *o* and *p* for the ball bearings *r* and *s*. The outer guides or races *t* and *u* for such ball bearings, are secured at corresponding distances apart; the guide or race *t* within the end *v* of the cylindrical propeller bush *w* and the guide or race *u* within the projecting tubular boss *y* of the driving wheel *z*. As will be seen the propeller bush *w* and driving wheel *z* freely revolves on the ball bearings *r* and *s*.

The end 3 of the propeller bush *w* is provided with a fixed flange 4, while its other end *v* is fitted with a suitable loose flange 5. Within the bush is an inwardly extending thrust flange 6 having parallel sides.

The outer end 9 of the flange 4 is recessed at 10 to receive the end 11 of an inwardly projecting flange 12 of the driving wheel boss *y* which is secured to the propeller bush by rivets 13.

Between the flange 12 and the other or toothed end of the boss *y* such boss is formed with an inwardly extending flange 16 against which the race or guide *u* abuts.

For the purpose of preventing endwise movement of the bush *w* in either direction, the tubular carrier is provided with thrust ball bearings 18 and 19 adapted to coact with flange 6. The balls of these bearings run on races or ways formed in plates or rings 20, 22, 23 and 26 threaded on the tubular carrier. The inner plate 20 bears against a shoulder 21 formed therefor on the carrier and the outer plate 26 is backed by a washer 24 that is maintained in place by the adjacent guide or race *o*. A nut 28 working on the screw threaded outer portion of the tubular carrier presses the washer 24, through the guide or race *o*, up against a shoulder 27 on the carrier tube.

Screwed on to the outer end *l* of the tubular carrier is a cap 30 which closes the annular space 31 between the carrier and the bush $w$, the end 34 of such cap 30 bearing against the end of the bush to retain the lubricant in all the ball bearings within the annular space 31.

The lubricating oil pipe and the high tension wires, Bowden wire for controlling the throttle lever on carbureter, and petrol pipe, may pass through the tubular carrier.

What I claim is:—

1. A motor, a crank casing for said motor, a tubular carrier fixed to said casing, and an aerial propeller driven by said motor and mounted to rotate on said carrier.

2. A motor, a crank casing for said motor, a tubular carrier fixed to said casing concentric with the crank shaft of said motor, and an aerial propeller driven by said motor and mounted to rotate on said carrier.

3. A motor, a crank casing for said motor, a tubular carrier fixed to said casing, an aerial propeller driven by said motor and mounted to rotate on said carrier, and means for taking end thrust of said propeller.

4. A motor, a crank casing for said motor, a tubular carrier fixed to said casing, an aerial propeller driven by said motor and mounted on said carrier and rotary bearings on said carrier surrounded by the hub of said propeller.

5. A motor, a crank casing for said motor, a tubular carrier fixed to said casing, an aerial propeller driven by said motor and the hub of which surrounds the said carrier, bearings for said propeller arranged in the space between the said carrier and the hub of said propeller, and means for closing the outer end of the said space.

6. A motor, a crank casing for said motor, a tubular carrier fixed to said casing, an aerial propeller driven by said motor and the hub of which surrounds the said carrier, bearings for said propeller arranged in the annular space between the said carrier and the hub of the said propeller, and means for closing the outer end of the said annular space.

7. A motor, a crank casing for said motor, a tubular carrier fixed to said casing, an aerial propeller driven by said motor and the hub of which surrounds the said carrier, rotary and thrust bearings for said propeller arranged in the space between the said carrier and the hub of said propeller, and means for closing the outer end of the said space.

8. In combination, a motor, a crank shaft driven by said motor, a crank casing, a tubular carrier formed with side openings fixed to said casing concentric with said crank shaft, a toothed driving wheel on said shaft located within said carrier, toothed driven pinions each projecting through a side opening of said carrier and gearing into said toothed wheel, short shafts on which said pinions are fixed, driving pinions fixed on said short shafts, a driven wheel embracing said carrier and engaged by said driving pinions, a propeller hub embracing said carrier and fixed to said driven wheel, and rotary bearings for said driven wheel and said hub mounted on said carrier.

9. In combination, a motor, a crank shaft driven by said motor, a crank casing, a tubular carrier formed with side openings fixed to said casing concentric with said crank shaft, a toothed driving wheel on said shaft located within said carrier, toothed driven pinions each projecting through a side opening of said carrier and gearing into said toothed wheel, short shafts on which said pinions are fixed, driving pinions fixed on said short shafts, a driven wheel embracing said carrier and engaged by said driving pinions, a propeller hub embracing said carrier and fixed to said driven wheel, rotary bearings for said driven wheel and said hub mounted on said carrier, and a thrust bearing for said hub.

10. In combination, a motor, a crank shaft driven by said motor, a crank casing, a tubular carrier formed with side openings fixed to said casing concentric with said crank shaft, a toothed driving wheel on said shaft located within said carrier, toothed driven pinions each projecting through a side opening of said carrier and gearing into said toothed wheel, short shafts on which said pinions are fixed, driving pinions fixed on said short shafts, a driven wheel embracing said carrier and engaged by said driving pinions, a propeller hub embracing said carrier and fixed to said driven wheel, ball bearings located in the space between said driven wheel and said carrier, ball bearings located in the space between said hub and carrier, and means for closing the outer end of the space between said hub and said carrier.

11. In combination, a motor, a crank shaft driven by said motor, a crank casing, a tubular carrier formed with side openings fixed to said casing concentric with said crank shaft, a toothed driving wheel on said shaft located within said carrier, toothed driven pinions each projecting through a side opening of said carrier and gearing into said toothed wheel, short shafts on which said pinions are fixed driving pinions fixed on said short shafts, a driven wheel embracing said carrier and engaged by said driving pinions, a propeller hub embracing sid carrier and fixed to said driven wheel, ball bearings located in the space between said driven wheel and said carrier, ball bearings located in the space between said hub and said carrier, a flange within said hub projecting toward said carrier, and ball bearings for taking end thrust arranged on said carrier at each side of said flange.

12. In combination, a motor, a crank shaft driven by said motor, a crank casing, a tubular carrier formed with side openings fixed to said casing concentric with said crank shaft, a toothed driving wheel on said shaft located within said carrier, toothed driven pinions each projecting through a side opening of said carrier and gearing into said toothed wheel, short shafts on which said pinions are fixed, driving pinions fixed on said short shafts, a driven wheel embracing said carrier and engaged by said driving pinions, a propeller hub embracing said carrier and fixed to said driven wheel, ball bearings located in the space between said driven wheel and said carrier, ball bearings located in the space between said hub and carrier, a flange within said hub projecting toward said carrier, ball bearings for taking end thrust arranged on said carrier at each side of said flange and a cap fixed on said carrier adapted to close the outer end of the space between said hub and said carrier.

Signed at Leeds, England, this twenty-eighth day of November 1911.

RUPERT JOHN ISAACSON.

Witnesses:
   ARTHUR STOREY,
   ROBERT EDWIN PEACOCK CRAVEN.